Oct. 4, 1932.　　　　E. HAZELL　　　　1,881,021

FORM FOR THE MANUFACTURE OF RUBBER ARTICLES

Filed March 13, 1928

INVENTOR
Eardley Hazell
BY
ATTORNEY

Patented Oct. 4, 1932

1,881,021

UNITED STATES PATENT OFFICE

EARDLEY HAZELL, OF NEW YORK, N. Y., ASSIGNOR TO MORGAN AND WRIGHT, OF DETROIT, MICHIGAN, A CORPORATION OF MICHIGAN

FORM FOR THE MANUFACTURE OF RUBBER ARTICLES

Application filed March 13, 1928. Serial No. 261,269.

This invention relates to a form for the manufacture of rubber articles directly from rubber latex or other aqueous dispersion of rubber by the direct deposition of the rubber onto the form of the shape desired. The form herein described may be of the internal or mandrel type, or it may be of the external or mold type. The invention aims to provide such a form capable of withstanding the usage to which it would be subjected in commercial manufacture, and further to provide a form which is not unduly expensive.

While the invention is illustrated in a form suitable for the manufacture of inner tubes by direct deposition of rubber from latex or equivalent dispersion, the principles embodied in the construction may be applied to the manufacture of other articles as well.

In the drawing Fig. 1 is a perspective of a portion of a curved or bent form suitable to the manufacture of inner tubes;

Figure 1:
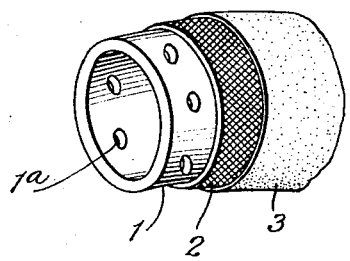
Figure 2:
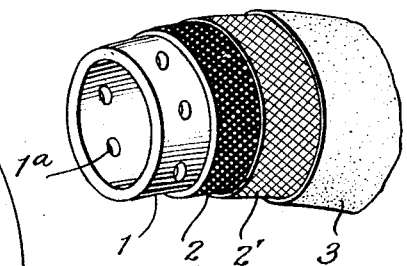
Fig. 2 is a similar view showing a modification.

In Fig. 1 is shown a shape retaining support 1 circumferentially wound with fabric strips 2 which are surfaced with a layer of a filtering composition 3. In Fig. 2 is shown a support 1 wrapped with a plurality of fabric strips 2 and 2', the latter being of finer weave than the former which is in contact with the support 1. A surfacing coating of filtering composition 3 overlays the outer fabric winding.

Figure 3:
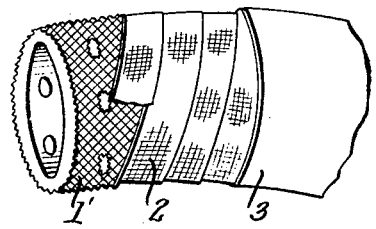
Fig. 3 is a similar view showing another modfication.

The support 1 may be apertured at suitable distances as indicated at 1a, or the support may be grooved or channeled, as shown in Fig. 3, to expedite the transverse flow of fluid (the continuous phase of the dispersion) during manufacture. Both apertures and channeling may be employed, if desired, in which case it is not necessary to have the apertures spaced very closely, as the channels or grooves or knurling will carry the fluid to the aperture. The shape retaining support is preferably made of metal, aluminum being quite suitable and light in weight. However, it is not necessary for the support to be metallic, but it should be shape retaining and rigid enough to withstand collapse and rough usage such as encountered in factory operation. Whether metallic or not, it is desirable to have the form of light weight, and of a material unaffected by water.

The fabric layer or layers may be conveniently applied in strip form, the strips being wound spirally in lapped or butted relation. The fabric may be woven in tubular shape and slipped over the support in the case of the mandrel type or applied in any other suitable and convenient manner. Any wrinkles in the fabric should be smoothed out by hand or by slightly twisting the fabric. The fabric may be either woven or felted although the former is preferred. One suitable construction is to have a fairly heavy close meshed fabric or absorbent paper adjacent the support, and a superimposed layer of finely woven fabric, or two or more wrappings of fine fabric or sheeting may be used.

The filtering composition which is applied over the outermost surface of the form may be painted or otherwise applied, and may be filtered directly on to the fabric by immersing the form in a filtering composition rendered sufficiently fluid for the purpose. Examples of suitable filtering compositions are water suspensions of kieselguhr, clays diatomaceous earths of various sorts and other pulverulent materials. Paper pulp in suspension may be used. The surfacing composition may be applied with a binder of suitable nature, preferably one which can be hardened by the application of heat at temperatures not sufficient to damage the fabric. Phenol-aldehyde liquid condensation products may be used, or gelatinized paper pulp or other organic binders. The material known in the trade as clay slip admixed with diatomaceous earth is an excellent filtering composition for application to the herein described forms, is easy to apply, and is inexpensive. Sufficient of the filtering composition is applied over the fabric layers to give a smooth continuous coating through which the ridges of the fabric preferably do not show. The surface 3 may be buffed or sand papered or otherwise rendered free from ridges or irregularities. The filtering surface 3 may be made as thick as desired but preferably for economic reasons is made as thin as possible. A thickness of .02 of an inch has been found satisfactory and even thinner surfaces may be employed.

Figure 4:
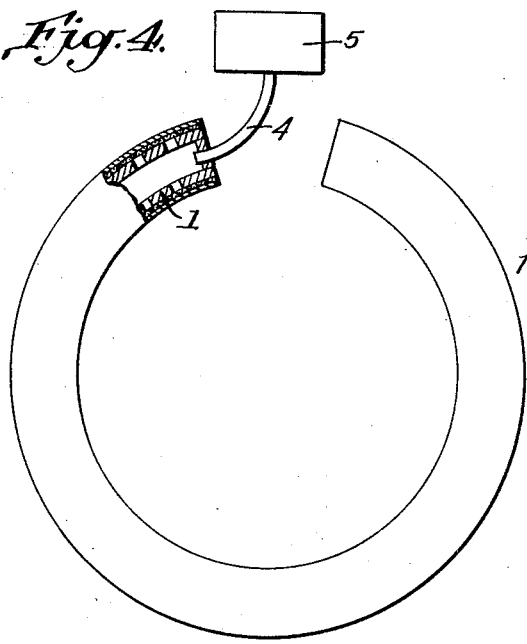
Fig. 4 is a view of a complete form, partly broken away, and provided with means for creating a vacuum within the form.

While the invention has been illustrated with forms of the internal or mandrel type, the same principles of construction may be applied to forms of the external or mold type and either curved, straight, or otherwise shaped to make the article desired. The forms may be suitably fitted so that the metallic support can serve as one electrode, in which case the rubber article may be formed by electro deposition of the rubber from the dispersion. The supporting member may also be fitted as shown in Fig. 4 for the application of a vacuum or otherwise permitting the application of a greater pressure in the latex than in the interior of the form away from the surface in contact with the latex. In the case of inner tube mandrels, the form may be tapered or otherwise constructed at the ends so that skived ends may be formed simultaneously with the deposition of the rubber. It will be understood that in the case of a mandrel which is straight or in the form of an incomplete annulus, the inner tube after being formed will be spliced or joined in any suitable manner to make a complete annulus. Or the forms may be made annular and a splice joint in the article obviated at least when of the external or mold type in which the deposit of rubber is built up inside the form. All uses to which the forms may be put are comprehended. Other modifications may be made without departing from the principles underlying the invention, and it is understood that all such modifications are intended to be comprehended in the accompanying claims to which reference should be made for an understanding of the scope of the invention.

Having thus described my invention, what I claim and desire to protect by Letters Patent is:

1. A device for use in the manufacture of rubber articles from a rubber dispersion which comprises in combination a support having apertures therethrough and provided with a knurled surface, said support having substantially the shape of the article to be formed, a layer of fabric over the knurled surface, a layer of filtering composition on the fabric capable of effecting the separation of the solid constituents of the dispersion, and means for reducing the fluid pressure on the side of the support distant from the filtering composition.

2. A device for use in the manufacture of rubber articles from a rubber dispersion which comprises in combination a support having apertures therethrough and provided with a knurled surface, said support having substantially the shape of the article to be formed, a layer of spirally wrapped fabric on the knurled surface, a layer of filtering composition on the fabric capable of effecting the separation of the solid constituents of the dispersion, and means for reducing the fluid pressure on the side of the support distant from the filtering composition.

3. A device for use in the manufacture of rubber articles from a rubber dispersion which comprises in combination a tubular support having substantially the shape of the article to be formed having apertures through its walls and being provided with a knurled surface, a layer of fabric over the knurled surface, and a layer of filtering composition over the fabric and adapted to effect the separation of the solid constituents of the dispersion.

Signed at New York, county and State of New York, this 10th day of March, 1928.

EARDLEY HAZELL.